(12) United States Patent
Miserocchi

(10) Patent No.: US 7,342,589 B2
(45) Date of Patent: Mar. 11, 2008

(54) SYSTEM AND METHOD FOR MANAGING GRAPHICAL DATA

(75) Inventor: Nathan P. Miserocchi, Chesterland, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 783 days.

(21) Appl. No.: 10/670,610

(22) Filed: Sep. 25, 2003

(65) Prior Publication Data

US 2005/0071804 A1    Mar. 31, 2005

(51) Int. Cl.
G06F 13/00 (2006.01)
G09G 5/00 (2006.01)

(52) U.S. Cl. .................. 345/536; 345/537; 345/538; 345/619

(58) Field of Classification Search ................ 345/420, 345/423, 473, 536, 619, 683, 537, 538; 717/165, 717/104, 105, 108, 109; 700/98
See application file for complete search history.

(56) References Cited

U.S. PATENT DOCUMENTS

| 6,061,067 | A | * | 5/2000 | Silva et al. .................. 345/619 |
| 6,219,049 | B1 | * | 4/2001 | Zuffante et al. ............. 715/764 |
| 6,362,839 | B1 | | 3/2002 | Hamilton et al. |
| 6,366,293 | B1 | | 4/2002 | Hamilton et al. |
| 6,556,950 | B1 | | 4/2003 | Schwenke et al. |
| 6,559,860 | B1 | | 5/2003 | Hamilton et al. |
| 6,618,856 | B2 | | 9/2003 | Coburn et al. |
| 7,064,766 | B2 | * | 6/2006 | Beda et al. .................. 345/557 |
| 7,079,990 | B2 | * | 7/2006 | Haller et al. .................... 703/2 |

OTHER PUBLICATIONS

Web pages regarding SolidWorks Corporation that manufactures software, obtained at <http://www.solidworks.com>, printed on May 24, 2004.

* cited by examiner

Primary Examiner—Kee M. Tung
Assistant Examiner—Hau H Nguyen
(74) Attorney, Agent, or Firm—Keith M. Baxter; William R. Walbrun

(57) ABSTRACT

A system and method for managing graphical information are disclosed. The system includes a processing device, first and second memory portions within at least one memory device coupled to the processing device. The first memory portion stores a first plurality of files having a first type of information relating to graphical entities, and a second plurality of files having a second type of information relating to graphical entities, where each of the second plurality of files references at least one of the first plurality of files. The second memory portion duplicatively stores a first subset of the first plurality of files and a second subset of the second plurality of files, where each of the files of the first subset are referenced by at least one of the files of the second subset, and where the first and second subsets have information relating to a first project.

25 Claims, 9 Drawing Sheets

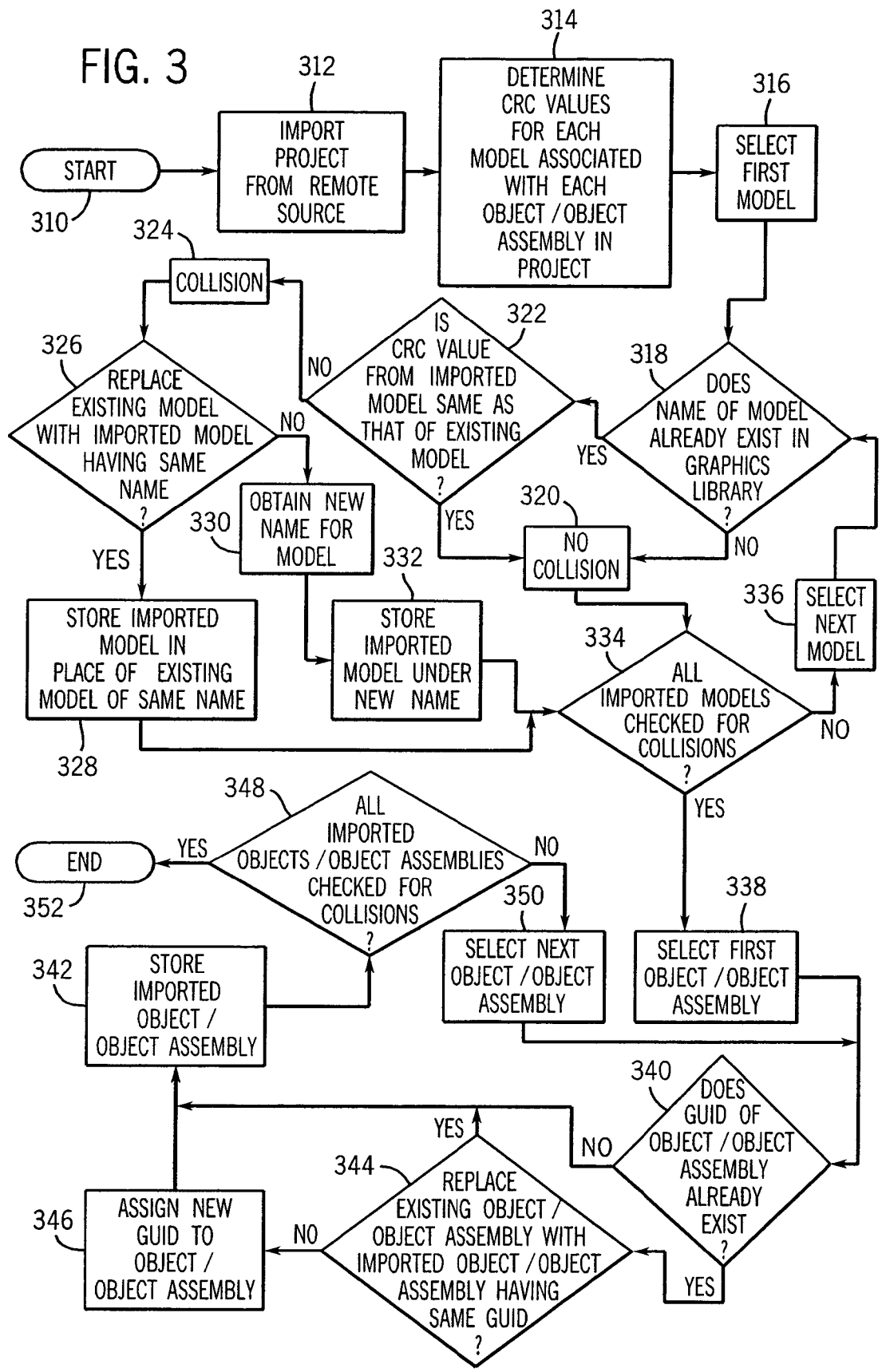

SYSTEM AND METHOD FOR MANAGING GRAPHICAL DATA

CROSS-REFERENCE TO RELATED APPLICATIONS

FIELD OF THE INVENTION

The present invention relates to computer systems and programs that utilize graphical data for various purposes, such as displaying graphical images and interacting with users by way of a graphical user interface that displays such images. More particularly, the present invention relates to systems and methods for managing such graphical data, particularly in terms of the storage, retrieval, modification and other handling of such data.

BACKGROUND OF THE INVENTION

As the capability of computer monitors and other display devices to display graphics has improved, and as computer storage and processing capabilities have also improved, it has become possible to display highly complicated graphical features. Such display of complicated graphical features has become useful in a variety of contexts. For example, computer-aided design (CAD) software is often a primary tool that is used to engineer devices, systems and processes. Also, for example, complicated graphical features can be employed to display processes and systems during operation, in order to facilitate the monitoring and control of such processes and systems.

The data underlying the display of such complicated graphical features can be voluminous and complicated. The size and complexity of the data associated with displaying graphical features in part results from the level of detail of the displayed graphical items, particularly three-dimensional graphical items. Further, the complexity associated with displaying graphical features in part results from the fact that, commonly, multiple discrete graphical items that have highly different characteristics must be simultaneously accounted for and displayed. The complexity is additionally increased when graphical items have movement/animation characteristics.

Due to the size and complexity of data concerning graphical features, various schemes for storing, retrieving and otherwise handling the graphical data have been developed and implemented in computer systems/software. In some known systems, a given graphical item can be stored as an assemblage of multiple pieces of data that are linked to one another in the form of a data structure. By storing data in this manner, it is possible to assemble the data for multiple graphical items using shared portions of data. That is, it becomes possible for multiple graphical items to refer to the same building blocks.

By storing data in this referential manner, the amount of data that must be stored and otherwise handled when displaying complicated graphical features can be reduced. However, because the different portions of data typically are stored in many separate files, the size and complexity of the graphical data can still pose significant problems. In particular, because multiple graphical items may draw upon the same data files, new file maintenance problems arise that would not exist if all of the data for a given graphical item was stored in a single file.

For example, when multiple users utilize the same data files, one user may change the contents of the file in order to change the characteristics of certain graphical item(s) without considering the impact such changes may have upon other graphical item(s) that also depend upon those files. Also, when a user imports data files from an outside source, it is possible that certain of the data files may be inconsistent with existing data files. For example, an imported file may have the same name as an existing data file despite having different data such that importation of the file may introduce ambiguity into the graphical data (due to the storing of a second file with the same name) or overwrite and unintentionally modify the existing data.

Such referential schemes for storing graphical data are also problematic insofar as it can be difficult to isolate subsets of graphical data that pertain to particular graphical images from other graphical data that may be stored on a system. The graphical data pertaining to a particular graphical image may be scattered about a variety of memory locations, intermingled with data corresponding to other graphical images. Consequently, it can be an arduous task to identify all of the specific graphical data relating to a particular graphical image in order to transfer that relevant data to another location. Further, when all of the data corresponding to a particular graphical image is transferred, caution must be exercised to avoid failing to leave copies of those portions of the graphical data that are referenced by other graphical images than the particular graphical image of interest.

For these reasons, a need exists for an improved system and method for managing graphical data, particularly graphical data that is stored as an assembly of data portions in a set of interdependent files or other data elements. In particular, a need exists for an improved system and method for managing graphical data that facilitates the modification of portions of the data in a manner that reduces the likelihood that such modifications will produce unintended consequences or introduce inconsistencies into the graphical data. Further, a need exists for an improved system and method for managing graphical data that facilitates the identification and transfer of specific subsets of the graphical data that is of interest in relation to particular graphical items or images.

BRIEF SUMMARY OF THE INVENTION

The present inventors have recognized that the graphical data associated with a graphical item can be viewed as a combination of (i) one or more first sets of data that relate to fundamental structural or other low-level characteristics, (ii) a second set of data that provides how the graphical item is to be constructed from such first sets of data and additionally certain default high-level characteristics, and (iii) a third set of data that concerns special modifications to the default high-level characteristics. A completed graphical item or "instantiated object" (or "instantiated sprite") formed from the combination of the first, second and third sets of data thus can be viewed as an instance of the default graphical item or "object" (or "sprite") formed from the combination of the first and second sets of data, where the default graphical item can in turn be viewed as a template that has been created using one or more "models" defined by the one or more first sets of data. Thus, a completed graphical item is an instantiated object template that references two lower levels of data, template object data and model data.

The present inventors further have recognized that, by conceptualizing and storing graphical data in this layered manner, it becomes more evident to users of the graphical data whether certain data is fundamental such that changes to the data may be more likely to inadvertently affect multiple graphical images. Further, it then becomes possible to employ varying levels of checking mechanisms to prevent data inconsistencies or other problems in relation to the different layers of graphical data that are in accordance with the degrees to which the different layers of graphical data tend to be referenced in the development of graphical images. In particular, two degrees of coding can be used to guarantee that inconsistencies do not arise with respect to the lowest layer of graphical data (namely, the first set of data defining models), while a single degree of coding can be used to guarantee that inconsistencies do not arise with respect to the middle and highest layers of graphical data (namely, the second set of data defining default graphical items or objects and the third set of data defining instantiated objects).

Additionally, the present inventors have recognized that the use of such coding with respect to the different layers of graphical data would make it possible to store certain graphical data in multiple locations without confusion, since duplicate copies of the graphical data could be readily identified as such given the coding associated with the graphical data. Consequently, the above-discussed coding of graphical data makes it possible to duplicatively store graphical data associated with a particular image (or images) in a secondary location in addition to storing that graphical data in a primary location. Because the graphical data associated with particular image(s) can be stored in a separate location where that data is not intermingled with the data of other images, the graphical data associated with those particular image(s) is readily identified and can be easily transferred to other, remote locations.

In particular, the present invention relates to a system for managing graphical information that includes a processing device, a first memory portion within at least one memory device that is coupled to the processing device, and a second memory portion within the at least one memory device. The first memory portion stores a first plurality of files having a first type of information relating to graphical entities, and a second plurality of files having a second type of information relating to graphical entities, where each of the second plurality of files references at least one of the first plurality of files. The second memory portion duplicatively stores a first subset of the first plurality of files and a second subset of the second plurality of files, where each of the files of the first subset are referenced by at least one of the files of the second subset, and the first and second subsets have information relating to a first project.

The present invention further relates to a method of managing information relating to graphical entities. The method includes receiving selections of graphical entities to be incorporated into a project, retrieving higher-level information concerning the selected graphical entities from a first memory portion, and storing the higher-level information concerning the selected graphical entities in a second memory portion associated with the project, where the higher-level information stored in the second memory portion is duplicative of the higher-level information stored in the first memory portion. The method further includes retrieving lower-level information concerning components of the selected graphical entities from the first memory portion, and storing the lower-level information concerning the components of the selected graphical entities in the second memory portion, where the lower-level information stored in the second memory portion is duplicative of the lower-level information stored in the first memory portion.

The present invention additionally relates to a method of managing information relating to graphical entities. The method includes providing a memory portion in which is stored a first amount of graphical information including first information concerning a first plurality of graphical entities and second information concerning a first plurality of components of the first plurality of graphical entities. The method further includes receiving a second amount of graphical information including third information concerning a second plurality of graphical entities and fourth information concerning a second plurality of components of the second plurality of graphical entities, where each of the graphical entities of the first and second pluralities of graphical entities has a respective first identification number, and each of the components of the first and second pluralities of components has a respective second identification number. The method additionally includes determining whether any of the second amount of graphical information conflicts with any of the first amount of graphical information at least in part by comparing the respective first identification number of each of the graphical entities of the second plurality with each respective first identification number of each of the graphical entities of the first plurality, and by comparing the respective second identification number of each of the components of the second plurality with each respective second identification number of each of the components of the first plurality.

BRIEF DESCRIPTION OF THE DRAWINGS

FIG. 3 is a flow chart showing exemplary steps of operation of the first system of FIG. 1 relating to the importation and reconciliation of graphical information received from a remote source (such as the second system of FIG. 1) with graphical information that already exists on the first system.

DETAILED DESCRIPTION OF THE INVENTION

Figure 1A:
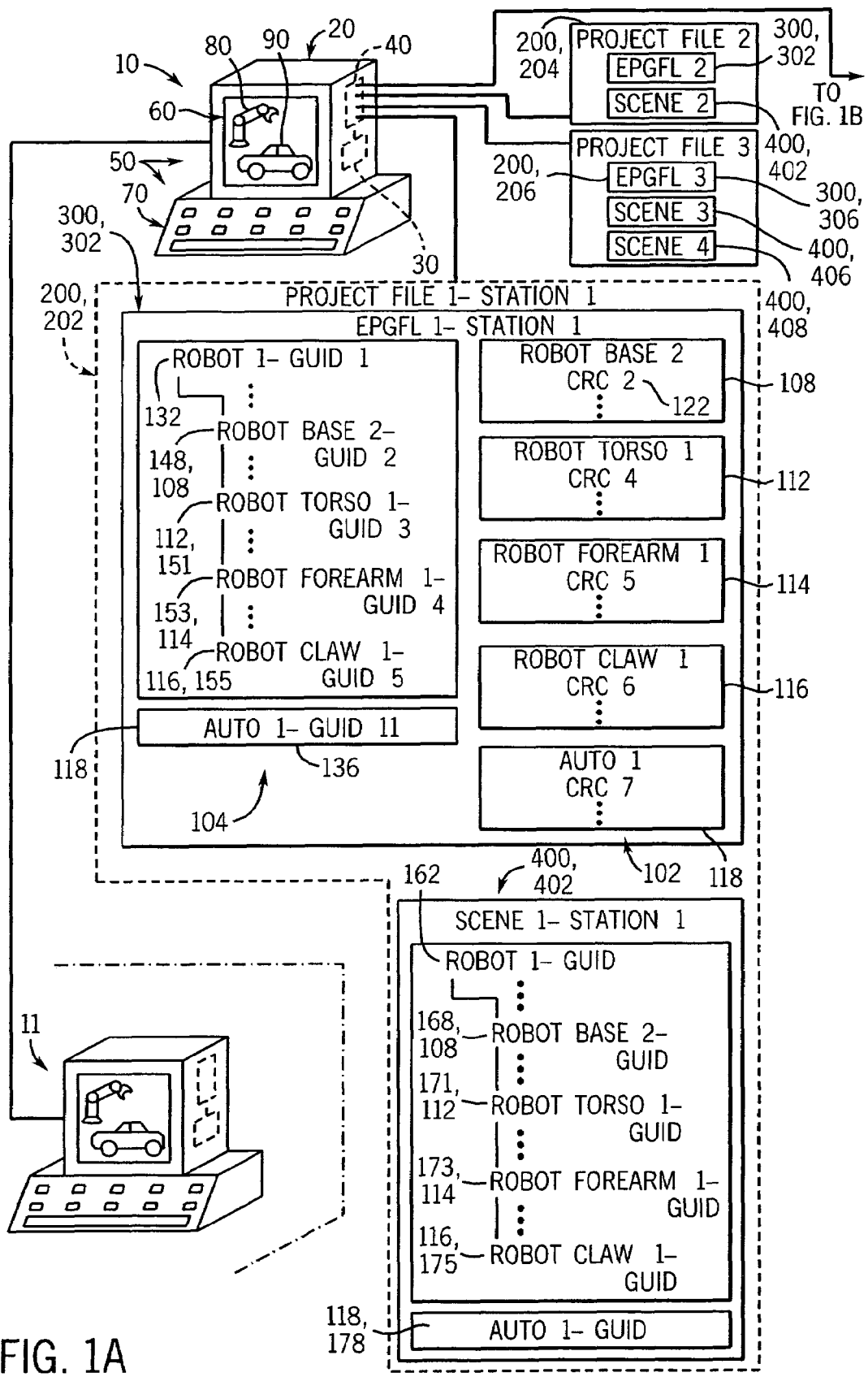
FIGS. 1(A)-1(B) are a schematic diagram showing a first system for managing graphical data in accordance with an embodiment of the present invention, where the system is also in communication with a second system.
Figure 1B:
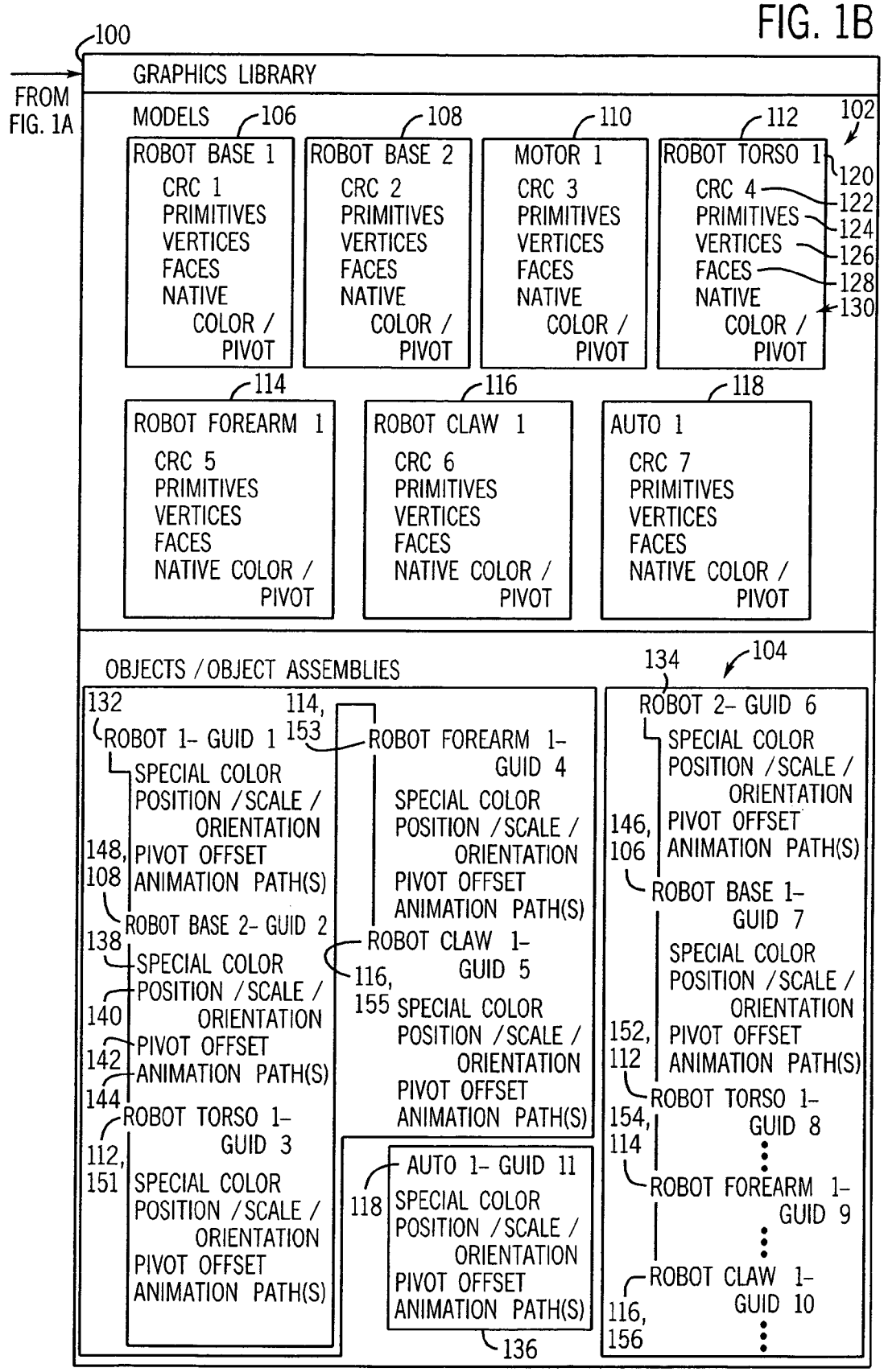

Referring to FIGS. 1(A)-1(B), a system for managing graphical data 10 is shown to be, in one embodiment, a personal computer 20 having a processing device 30, a memory device 40 and an operator interface portion 50 that includes a visual display device 60 on which can be displayed graphical images. In the embodiment shown, the operator interface portion 50 also includes an input device shown to be a keyboard 70. In alternate embodiments, the personal computer 20 can vary from that shown. For example, the operator interface portion 50 can include a different or additional input device other than the keyboard 70, for example, a mouse, or the screen 60 can be a touch screen device. Further, the system 10 need not employ a personal computer 20. Rather, any device or set of devices encompassing a memory device sufficient for storing graphical data, an output device capable of displaying graphical images or other graphical information, and a processing device could suffice. For example, the memory device 40, rather than being housed within a personal computer as shown, instead could be memory provided by a remote storage unit or server computer located remotely from an operator terminal such as a workstation. Further, the display device for displaying graphical images could be coupled to memory devices and processing devices by way of any one of a number of networks, such as networks employing ControlNet or the Internet.

As shown in FIGS. 1(A)-1(B), graphical information utilized by the system 10 is stored in a specific manner using multiple memory locations within the memory device 40 or, in alternate embodiments, multiple memory locations within multiple memory devices. Specifically, graphical information is stored in a graphics library 100 and one or more project memory locations/project files 200. Each of the project files 200 in turn includes at least one embedded project graphics file library ("EPGFL") 300 along with one or more scene memory locations 400. In the embodiment shown, the one or more project files 200 encompass first, second and third project files 202, 204 and 206, each of which corresponds to graphical imaging data associated with first, second and third projects. Each of the respective project files 202,204 and 206 in turn includes a respective EPGFL 302, 304 and 306, and one or more respective scene memory locations 402, 404, 406 and 408 (with the project file 206 including both of the scene memory locations 406 and 408). However, depending upon the embodiment or occasion for use, there can be any number of project files 200 corresponding to the number of projects that have been, or currently are being, created or worked with.

Each of the scene memory locations 400 in particular includes graphical information corresponding to a particular scene with respect to a given one of the project files 200. Although in FIG. 1(A), only a single scene memory location 402 is shown corresponding to the EPGFL 302 and project file 202, a given project file 200 can encompass any number of scene memory locations (e.g., as shown, the project file 206 includes two scene memory locations 406 and 408). Each of the scene memory locations 400 stores particular graphical imaging data that is to be displayed on a particular screen or display location at a given time. For example, as is discussed in greater detail below, the scene memory location 402 of FIG. 1(A) includes graphical imaging data related to a robot and an automobile, which corresponds to a robot 80 and a vehicle 90 that are displayed on the screen 60 of the personal computer 20. As with the graphics library 100, each of the project files 200 and each of the EPGFLs 300, each of the scene memory locations 400 also in the present embodiment constitute file libraries, although in alternate embodiments the data can be stored in other arrangements than as files.

Further referring to FIGS. 1(A)-1(B), the graphics library 100 stores graphical information in two categories of files, first as models 102 and second as objects or object assemblies 104. In the embodiment shown, the models 102 within the graphics library 100 include seven models corresponding to seven different basic graphical items, namely, first and second robot base models 106 and 108, a first motor model 110, a first robot torso model 112, a first robot forearm model 114, a first robot claw model 116, and a first automobile model 118. As shown, each of the models 102 specifies the same types of information, namely: a model name 120; a checksum or cyclic redundancy check ("CRC") value 122; primitives information 124; vertices information 126; faces information 128; and native color and pivot information 130. This information 120-130 is fundamental information that describes fundamental attributes of a graphical item. For example, the primitives information 124 indicates certain fundamental graphical shapes that are used to create the given graphical item. The vertices information 126 provides information identifying key geometric vertices, inflection points and other points of interest. The faces information 128 constitutes information indicating directional orientations of different surfaces of the graphical item. The native color and pivot information 130 indicates default color attributes associated with the graphical item and a default pivot point about which the graphical item would rotate if commanded to do so.

Each of the models 102 is identified as a distinct file entity by virtue of its name information 120 and its CRC value 122. Typically, no two models having different names share the same CRC value, and no two models having different CRC values share the same name. As discussed in further detail below, this dual identification of different models by way of both name information 120 and CRC values 122 makes it possible to efficiently distinguish between different models that might otherwise be confused if they simply had the same name and were not identified additionally by a specific CRC value. The CRC value 122 associated with each model 102 can be calculated in any of a number of manners. Typically, the CRC value 122 is calculated as a checksum based upon (e.g., by adding) all of the other information stored within its particular model, e.g., based upon the primitives information, vertices information, faces information, native color and pivot information, and even possibly the name of the model. The graphics library 100 may include any number of models 102, and there may be multiple different models that concern similar or related graphical items. For example, the models 102 shown in FIG. 1(B) include two different models 106, 108 that correspond to two different versions of a robot base.

Referring still to FIGS. 1(A)-1(B), the graphics library 100 additionally includes objects and object assemblies 104. The objects/object assemblies 104 are templates of graphical data formed from one or more of the models 102 within the graphics library 100 and certain supplemental information. That is, the objects/object assemblies 104 refer to the basic information stored in association with one or more of the models 102, and additionally store further information that is more specialized and further defines features of a particular object or object assembly that is formed using such model(s). FIG. 1(B) in particular shows three different stand-alone objects and object assemblies 104, namely, a first robot object assembly 132, a second robot object assembly 134 and a first auto object 136. Each of the object assemblies 132, 134 in turn is formed from several objects, namely first and second robot base objects 146, 148, first and second robot torso objects 151, 152, first and second robot forearm objects 153, 154, and first and second robot claw objects 155, 156.

Further, as shown in FIG. 1(B), the object assemblies 132, 134 differ from the stand-alone object 136 insofar as the object assemblies are formed from a combination of more than one of the models 102, while the stand-alone object is formed by way of only a single one of the models 102. Thus, in the example shown, the first robot object assembly 132 is formed using the second robot base model 108 along with the first robot torso model 112, the first robot forearm model 114 and the first robot claw model 116, while the second robot object assembly 134 is formed using the first robot base model 106 along with the first robot torso model 112, first robot forearm model 114 and first robot claw model 116.

In contrast, the automobile object 136 is formed using only the first automobile model 118. The exact composition of the objects and object assemblies 104 shown in FIG. 1(B) are only exemplary and will vary from embodiment to embodiment and situation to situation depending upon the particular graphical items that are intended to be displayed. Each object and object assembly typically has its own name and further includes, as part of its information, the name(s) of the model(s) to which the object/object assembly refers. In certain embodiments, such as that shown in FIG. 1(B), the name(s) of the objects/object assemblies will be based upon the names of the models that are referenced, such that the names of the objects/object assemblies will serve both as names and as references to the relevant models (e.g., the name of the second robot base object 148 serves both as a name for the object and as a reference to the second base model 108).

Referring still to FIGS. 1(A)-1(B), each of the objects and object assemblies 104 includes, in addition to the information associated with one or more of the models 102, certain supplemental information. Specifically, each of the models included within each object/object assembly is supplemented with special color information 138, position/scale/orientation information 140, pivot offset information 142, and animation path(s) information 144 such that an object based upon that model is formed (either as part of an overall object assembly or as a stand-alone object). Also, with respect to the object assemblies in particular (e.g., the object assemblies 132 and 134), each overall object assembly is provided with this supplementary information concerning special color, position/scale/orientation, pivot offset and animation path(s) in addition to such information being provided with respect to each individual object included within the object assembly.

The special color information 138 supplements the native color information 130 in a given model as may be appropriate; for example, with respect to the first robot object assembly 132, it might be desirable for the robot base object 148 to take on a different color than the native color of the underlying robot base model 108 when included as part of the first robot object assembly. With respect to the position/scale/orientation information 140, this information can be used to position the particular object or object assembly 104 on the screen, alter the relative size of the object/object assembly, and determine the object/object assembly's two or three dimensional orientation. The pivot offset information 142 allows for the pivot point about which the object or object assembly rotates to be modified from the native pivot point specified in the model. Further, the animation path(s) specify directions and speeds of movement of the object or object assembly across the screen.

Further as shown in FIG. 1(B), each of the objects and object assemblies 104 is assigned its own identification code, which in the present embodiment is a 128 bit globally unique identifier (GUID) (although in alternate embodiments, the code need not be numeric or be a 128 bit code). Thus, the first robot object assembly 132 has a GUID of one and each of its component objects, namely the base, torso, forearm and claw objects 148, 151, 153 and 155, is assigned its own particular GUID, in this example numbers 2-5. With respect to the second robot object assembly 134, an additional five GUID numbers 6-10 are assigned to the overall object assembly and its four component objects 146, 152, 165 and 156. Additionally, with respect to the first automobile object 136, another GUID number 11 is assigned. The exact supplementary information in addition to the information contained in the models 102 that is included in the objects/object assemblies 104 can vary from the exact information shown. For example, the special color information 138 need not be included. Also, other types of information not shown in the exemplary embodiment of FIG. 1(B) can be included in different embodiments. FIG. 1(B) additionally shows that, while two or more objects (e.g., objects 151 and 152) can be formed based upon the same model (e.g., model 112), the objects often will not be identical in their information and, in any event, will not share the same GUID.

In accordance with the present embodiment of the invention, an object or object assembly 104 is distinguished from other objects and object assemblies strictly by way of its GUID number. The GUID number for each object and object assembly 104 can be determined in any of a number of manners, including as a checksum of all of the information contained within the object or object assembly. Each object and object assembly having different information will have a different GUID number and consequently the different objects and object assemblies can be distinguished from one another based upon their GUID numbers. Consequently, more than one object or object assembly can have the same name and still be distinguished from one another based upon their respective GUID numbers. Thus, in contrast to the models 102, which when differing from one another must have both different CRC values 122 and different names 120, the objects/object assemblies 104 when differing from one another need only have different GUID numbers.

FIGS. 1(A)-1(B) (specifically FIG. 1(A)) additionally show multiple project files 200 (e.g., project files 202, 204 and 206) in which are stored graphical data corresponding to different projects. The first project file 202 in particular is for a project concerning a first station of a hypothetical assembly line, while the second and third project files 204 and 206 can store graphical data corresponding to other projects (e.g., second and third stations of the hypothetical assembly line). As shown, each of the project files 202, 204 and 206 includes a respective EPGFL 302, 304 and 306, one or more respective scene memory locations 402, 404, 406 and 408. The contents of the first EPGFL 302 are shown in greater detail to illustrate exemplary contents of an EPGFL. That is, the contents of an EPGFL can and will vary from those shown in FIG. 1(A) depending upon the embodiments and depending upon the particular contents of any given project. The contents of each of the second and third EPGFLs 304 and 306 could be the same or similar to that of the first EPGFL 302 or differ from that of the first EPGFL.

Although the specific contents of different EPGFLs 300 will tend to vary, the contents of each EPGFL do share certain similarities. Each EPGFL 300 of a given project file 200 stores particular files that correspond to particular files stored within the particular scene memory location(s) 400 within the same project file 200, where the files within the scene memory location(s) concern particular graphical items to be displayed as part of scene(s) defined by the scene memory location(s). Further, the files within an EPGFL 300 are the same types of information as are stored within the graphics library 100, namely, either objects/object assemblies 104 or models 102. Additionally, every file within an EPGFL 300 matches certain of the objects/object assemblies and models stored in the graphics library 100. That is, the contents of each EPGFL 300 match those of the graphics library 100 or, more typically, a subset of the contents of the graphics library.

For example, with respect to the first EPGFL 302, that exemplary EPGFL stores the first robot object assembly 132 and the first automobile object 136. The first robot object assembly 132 includes all of the information that is included within the first robot object assembly stored in the graphics library, e.g., each of the objects 148, 151, 153 and 155, the references to information in the corresponding component models 108, 112, 114, and 116 and all the corresponding supplemental information 138, 140, 142 and 144 including the same GUID numbers. Similarly, the first automobile object 136 stored within the first EPGFL 302 includes all of the information associated with the first automobile object 136 that is stored within the graphics library 100, including the supplemental information 138-144, the same GUID number, and the reference to the information in the first automobile model 118.

Although each of the objects/object assemblies 104 include the model information associated with the models 102 from which the objects/object assemblies are formed, the model information is only included by reference. That is, the object/object assembly files themselves do not include the information of the models but rather include references to the models files that are stored in a different location. Therefore, each object/object assembly 104 stored in the graphics library 100 has one or more references to model files that are located in one or more different storage locations than the remainder of the information of the objects/object assemblies. Similarly, each object/object assembly 104 stored in each of the EPGFLs 300 does not store the model information for the models from which the objects/object assemblies are formed in the same locations at which the remainder of the object/object assembly information is stored, but rather each object/object assembly includes one or more references (or links) to the model information, which is located elsewhere. By providing such a referential system in which the objects/object assemblies 104 refer to the models 102 rather than including the model data collectively along with the remaining data of the object/object assemblies, certain fundamental attributes of multiple objects/object assemblies can be changed without individually adjusting the information stored in each of those individual objects/object assemblies. For example, any robot object or object assembly that utilizes the data associated with the first robot base model 106 will be altered in its characteristics if one alters the characteristics of the first robot base model 106. This is advantageous insofar as it allows for global changes to be relatively easily made to multiple objects/object assemblies, particularly when updates are being made, simply by altering one or more models that are referenced by each of those objects/object assemblies.

Further as shown in FIG. 1(A), the objects/object assemblies 104 within a given EPGFL do not refer to the models 102 that are stored within the graphics library 100, but rather refer to copies of those models 102 that are stored within the EPGFL itself whenever objects/object assemblies referencing those models are added to the EPGFL. Thus, because the first robot object assembly 132 within the first EPGFL 302 refers to each of the second robot base model 108, the first robot torso model 112, the first robot forearm model 114 and the first robot claw model 116, each of those four models is also stored within other memory locations within the first EPGFL. Likewise, because the first automobile object 136 refers to the first automobile model 118, that model is also copied within the first EPGFL 302.

As shown in FIG. 1(A), an exemplary scene corresponding to the project associated with the first project file 202 and first EPGFL 302 could include a particular automobile being operated upon by a particular robot assembly (see the image shown in the screen 60). To create this scene, data concerning instantiated objects/instantiated object assemblies that correspond to the objects/object assemblies of the EPGFL 302 would be stored in the appropriate scene memory location 402 and then accessed by the processing device 30 and used to generate the scene on the screen 60. As shown, the graphical data stored in the first scene memory location 402 in this case would include a first instantiated robot object assembly 162 that corresponds to the first robot object assembly 132, and which in turn includes four corresponding instantiated objects 168, 171, 173 and 175 that correspond to the objects 148, 151, 153 and 155. Likewise, an instantiated automobile object 178 would be included within the scene memory location 402 corresponding to the automobile object 136.

As shown, each of the instantiated objects/object assemblies 162 and 178 and their component objects 168, 171, 173, 175 within the scene memory location 402 have different GUID numbers than their corresponding objects/object assemblies within the EPGFL 302. It is appropriate to provide different GUID numbers to the instantiated objects/object assemblies since, although the models 108, 112, 114, 116 and 118 underlying the instantiated objects/object assemblies in the scene memory location 402 are identical to the models referred to by the objects/object assemblies within the EPGFL 302 and the graphics library 100, the supplemental information stored as part of the instantiated objects/object assemblies can differ from the supplemental information 138-144 that is stored within the corresponding EPGFL 302 and within the graphics library 100. The supplemental information 138-144 stored within the corresponding EPGFL 302 and graphics library 100 is default information, such that the objects/object assemblies within the EPGFL 302 and graphics library 100 constitute templates. When the objects/object assemblies are instantiated and added to the scene memory location 402, this default information can, but need not, be altered during the instantiation process.

To summarize, therefore, in the present embodiment of a system for managing graphical information, graphical information is stored as follows. The graphics library 100 stores all objects/object assemblies that are used (or potentially might be used) in any projects, as well as all models that are used (or potentially might be used) in any projects. The objects/object assemblies are templates that include default supplemental information and also include references to certain of the models stored in the graphics library. The models provide fundamental graphical information that is the basis for forming objects, and any given model can be referenced by one or more objects. Each model is identifiable both by a distinctive name and a distinctive CRC value, while each object/object assembly is identifiable by a distinctive GUID.

In addition to the graphics library, the system also includes one or more project files that store data concerning specific projects that can involve one or more graphical scenes/images. Each project file includes at least one EPGFL in which is stored one or more objects/object assemblies that are identical to corresponding objects/object assemblies in the graphics library. Each EPGFL further includes all models that are referenced by the objects/object assemblies stored in the EPGFL, with the models also being identical to corresponding models in the graphics library. The specific objects/object assemblies and models that are stored in an EPGFL are those which are necessary in order to form the basis for instantiated objects/object assemblies that are stored in one or more scene memory locations that also form part of the project file. Although the instantiated objects/object assemblies of the scene memory locations are based upon corresponding objects/object assemblies stored in the corresponding EPGFL and the graphics library, the instantiated objects/object assemblies have different GUIDs than those objects/object assemblies, which is primarily reflective of the possibility that the instantiated objects/object assemblies can have different supplemental information than the default supplemental information of the objects/object assemblies. The graphical information stored in the scene memory locations as the instantiated objects/object assemblies (including references to the models stored in the corresponding EPGFL) forms the basis for graphical scenes/images/items that can be displayed on output display devices.

Figure 2A:
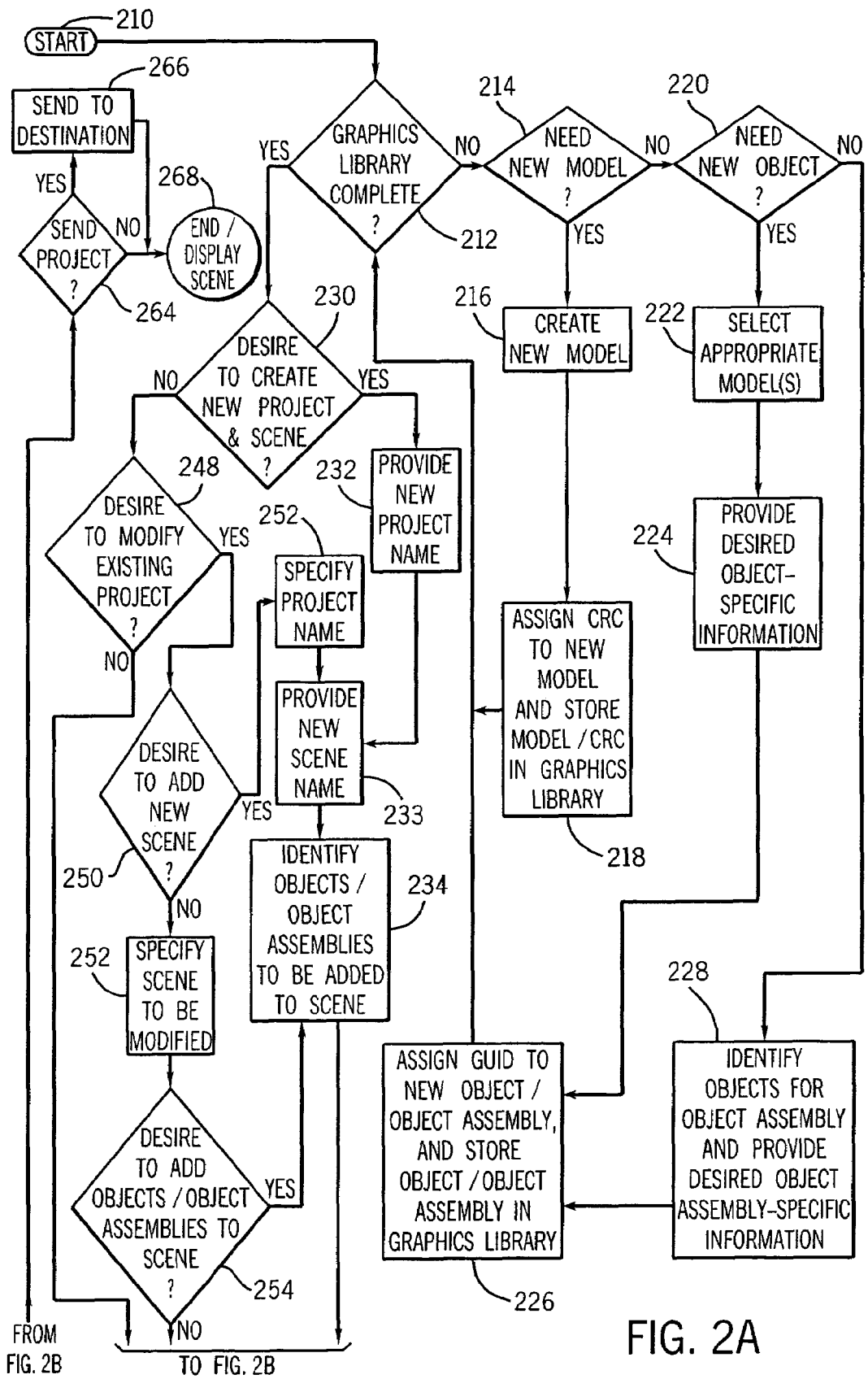
FIGS. 2(A)-2(B) are a flow chart showing exemplary steps of operation of the first system of FIG. 1 relating to the storage, retrieval, modification, and other management of graphical data.
Figure 2B:
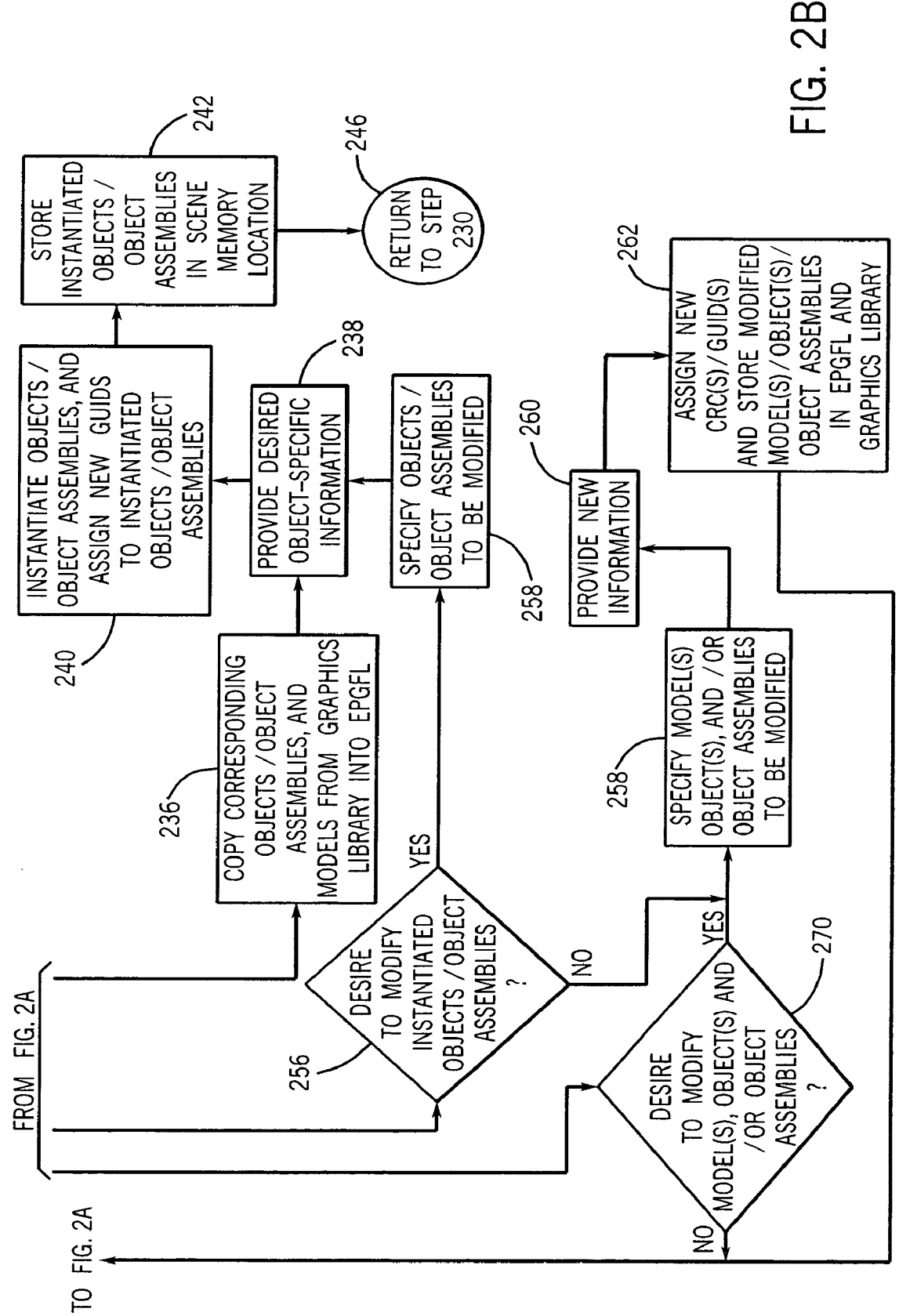

Turning to FIGS. 2(A)-2(B), exemplary steps of operation of the system 10 (and additionally possibly the system 11) of FIGS. 1(A)-1(B) relating to the creation and modification of models, objects, object assemblies, projects and screens are shown. Upon starting operation at step 210, a user of the system has an opportunity to determine whether the graphics library 100 is complete in terms of the models 102 and objects/object assemblies 104 that are stored within the graphics library, at step 212 (also, in alternate embodiments, it would be possible for an automatic system such as a computer processor operating a computer program to determine whether changes or additions need to be made with respect to the graphics library). If the graphics library 100 is not complete, and a new model is needed as determined at step 214, then the user creates a new model at step 216. The creation of such a model could be performed through the use of a software model creation tool. For example, a user could select a create model option from a menu, which in turn would provide fields for the entry of appropriate model information such as information 120-130 shown in FIGS. 1(A)-1(B). Once all of the model information concerning the new model is specified, including the name of the model, then at step 218 a CRC value is then determined and assigned with respect to the model, and the model along with its CRC value and other information is then stored in the graphics library.

If a new model is not needed as determined at step 214 but rather a new object is needed as determined at step 220, then the new object is created by the user by selecting the appropriate models that form the object, at step 222, and then providing the desired object-specific information (e.g., supplemental information 138-144), at step 224. The models can be selected using a conventional tool such as a file directory listing that shows all of the models available in the graphics library, and the object-specific information can be entered by way of a tool such as that described above relating to the entry of model information at step 216. Once the appropriate models have been selected and the desired object-specific information has been provided by the user, a GUID can be assigned to the new object at step 226, and the object can then be stored in the graphics library.

If neither a new model is needed at step 214 nor a new object is needed at step 220, then it is desired to create a new object assembly. Thus, at step 228, the user identifies objects to be included within the object assembly and provides desired object assembly-specific information with respect to that object assembly. Again, as discussed above, the objects for the object assembly can be selected by the user from a file directory showing objects (or other object assemblies) within the graphics library 100, and the object assembly-specific information can be entered by way of a software tool. It should be noted that, in this situation, the only additional object assembly-specific information that should be entered relates to the object assembly as a whole rather than to the particular objects that form the object assembly. Once all of this information has been provided, a GUID is assigned to the new object assembly and the object assembly is then stored in the graphics library, at step 226.

As shown, upon completing steps 218 and 226, it is again determined whether the graphics library is completed step 212, and thus steps 212-228 are repeated as necessary until the graphics library is complete. Once the graphics library 100 is complete, it may at that time be appropriate to create a new project file 200 (with a scene), at step 230. If it is desired to create a new project file 200, the user specifies a project name at step 232 and provides a new scene name for a scene corresponding to the new project at step 233. Then, at step 234, the user selects objects and/or object assemblies 104 (e.g., from a listing of objects/object assemblies contained in the graphics library 100) for inclusion in the new scene corresponding to the new project. At step 236, these selected objects/object assemblies (templates) are then copied from the graphics library 100 and stored in a new EPGFL 300 that is created corresponding to the new project file 200. When the objects/object assemblies 104 are added to the EPGFL 300, the system 10 also automatically adds the models 102 corresponding to those objects/object assemblies to the EPGFL (also as part of step 236). Thus, it is not necessary for a user to expressly identify both the objects/object assemblies and models to be included in a given project.

As the objects/object assemblies 104 are specified, the user also has an opportunity to provide new object-specific (or object assembly-specific) information with respect to the selected objects/object assemblies, at step 238. This object-specific information can modify the default supplemental information 138-144 associated with the objects/object assemblies 104 (which are templates). Once the user has provided such information, and/or has indicated that some or all of the default information should not be changed (e.g., by failing to provide new object-specific information), the system 10 instantiates the objects/object assemblies and assigns new GUIDs to those instances of the objects/object assemblies, at step 240. Then, at step 242, these instantiated objects/object assemblies are stored in a new scene memory location 400 corresponding to the newly-created scene. Thus, a new scene with instantiated objects and/or object assemblies 104 is formed, and the system 10 can return to step 230 (at step 246).

If, at step 230, the user does not indicate a desire to create a new project file 200 corresponding to a new project, then the system 10 proceeds to step 248, at which the user has an opportunity to modify an existing project file 200. If the user does not desire to modify an existing project file 200 at step 248, then the system 10 proceeds to step 270, at which the user has an opportunity to modify one or more of the model(s) and/or objects/object assemblies stored in the graphics library 100. Changes to models, objects or object assemblies within the graphics library 100 can result in corresponding changes within EPGFLs 300 that have copied those models, objects or object assemblies. If the user indicates a desire to modify any of these items, then the system proceeds to steps 258-262 as described in greater detail below. However, if the user does not desire to modify any of these items, then the system proceeds to steps 264-268 as discussed below.

If the user desires to modify an existing project file 200, then the user further is provided with an opportunity to add a new scene with respect to an existing project file at step 250. If the user wishes to do this, then the user specifies the project file 200 in which the new scene is to be incorporated, at step 252. From step 252, the system 10 then follows steps 233-246 discussed above allowing the new scene to be created. If at steps 250 the user does not indicate a desire to add a new scene, then the user presumably desires to modify an existing scene of an existing project file 200, and consequently at step 252 the user indicates the scene to be modified (and thus also indicates the project file 200 relating to the scene).

Modification of an existing scene could entail the addition of further instantiated objects/object assemblies 104 to the scene memory location 400, a modification (or deletion) of existing instantiated objects/object assemblies within the scene memory location, or modification of the models and/or objects/object assemblies underlying the instantiated objects/object assemblies of the scene. Thus, at step 254, it is determined whether the user wishes to add objects/object assemblies to the scene. If so, then the system 10 then follows steps 234-246 discussed above allowing for the addition of instantiated objects/object assemblies to a scene memory location 400 (and appropriate changes to the corresponding EPGFL 300). If not, then it is determined at step 256 whether the user wishes to modify any of the instantiated objects/object assemblies within the existing scene. If it is desired to do so, then at step 258 the user specifies the instantiated objects/object assemblies that are to be modified, and then the system 10 proceeds through steps 238-246 involving reinstantiation of objects/object assemblies and storage of those reinstantiated objects/object assemblies in the scene memory location 400 (and appropriate changes to the corresponding EPGFL 300). Although not explicitly shown in FIGS. 2(A)-2(B), this process can include the deletion of instantiated objects/object assemblies from the scene memory location 400 (and appropriate changes to the corresponding EPGFL 300) where the user desires to eliminate such graphical items from the scene.

If at step 256 it is determined that the user does not desire to modify any of the instantiated objects/object assemblies 256 of a scene, then the user desires to modify one or more of the models, objects and/or object assemblies within the EPGFL 300 associated with the project file 200 (since at step 248 it was determined that the user desired to modify something relating to the project). Thus, at step 258 the user specifies the one or more models, objects and/or object assemblies of the EPGFL 300 (which are also in the graphics library 100) that are to be modified. Then, at step 260, the user provides replacement information to be used to modify the selected the models/objects/object assemblies. This information, in the case of models 102, can include replacement information to be substituted for the existing information 120-130 within the models and, in the case of objects/object assemblies, can include replacement information concerning either the models that are referenced by the objects/object assemblies or the supplemental information 138-144 (or, in alternate embodiments, other information).

Once the replacement information is provided, then the models/objects/object assemblies are provided with updated CRC values or GUIDs, and are stored in the EPGFL 300 corresponding to the project file 200 of interest as well as within the graphics library 100, at step 262. Depending upon the embodiment, the modified models/objects/object assemblies may or may not be stored over (so as to erase) the original models/objects/object assemblies. Upon completion of step 262, the project file 200 is in a completed form, such that its corresponding EPGFL 300 has all of the appropriate models/objects/object assemblies for the project and its corresponding scene memory location 400 has all of the appropriate instantiated objects/object assemblies. Consequently, at step 264, a user may desire to transfer the project file 200 from the system 10 to another system such as the system 11. If a user chooses to send the project file at step 264, the project then is sent to its destination at step 266. Also, regardless of whether the project is sent to a recipient, the process of developing a project file 200 is then ended at step 268 such that the scene(s) associated with the completed project file 200 can be displayed on a display device.

Turning to FIG. 3, the system 10 performs certain special operations when graphical information is imported from a remote source. Starting at step 310, a project file 200 from a remote source such as the system 11 can be imported at step 312. Typically, entire project files 200 are transferred as opposed to objects or object assemblies (or models) that form parts of those project files. Nevertheless, in alternate embodiments, objects, object assemblies, and models can also be transferred individually. Upon receiving the imported project file, the system 10 then proceeds to step 314, at which it determines CRC values for each model that is associated with each object/object assembly of the imported project. At step 316, a first of the models associated with the objects or object assemblies in the project is selected. Then at step 318, the system 10 determines whether the name of the selected model already exists in the graphics library 100. If the name does not already exist in the graphics library 100, then no collision exists between that imported model and any existing model within the graphics library, and so the system proceeds to step 320. However, if the name of the model already does exist in the graphics library, then the system 10 at step 322 determines whether the CRC value associated with the imported model is identical to that of the model already existing within the graphics library.

If the CRC values of the imported model and existing model are identical, then the imported model is identical to the existing model and so no collision takes place (in such case, the imported model will not be resaved within the graphics library 100). However, if the CRC value from the imported model is different from that of the existing model within the graphics library 100, a collision has occurred in which the imported model and pre-existing model are actually different models despite having the same name. Consequently, the system proceeds to step 324 and then the user is presented, at step 326, with the choice of whether or not to replace the existing model with the imported model having the same name. If the user, at step 326, decides to replace the existing model with the imported model, the system proceeds to step 328, at which the imported model is stored in the graphics library over the existing model of the same name. Otherwise, a new name is obtained for the imported model at step 330 and the imported model is then stored within the graphics library 100 under that new name at step 332. Upon completion of each of steps 320, 328 and 332, the system proceeds to step 334, at which it is determined whether all the models of the imported project have been checked for collisions with existing models in the graphics library 100. If all models have not been checked, then the system proceeds to step 336 at which another model is selected and then returns to step 318.

However, if all models have been checked for collisions, then the system proceeds to step 338, at which the system selects a first of the objects or object assemblies that have been imported with the project. Then, at step 340, the system determines whether the GUID of the selected object or object assembly already exists within the graphics library 100. If the GUID does not already exist, then the imported object or object assembly is stored within the graphics library 100 at step 342, and also may be stored within a given EPGFL (e.g., an EPGFL associated with an existing project on the system) if the user so specifies. If at step 340, the GUID of the selected object or object assembly already exists within the graphics library 100, then the system proceeds to step 344, at which the user can determine whether to replace the existing object or object assembly within the graphics library (and any EPGFLs containing that object/object assembly) with the imported object or object assembly having the same GUID. If the user decides to replace the existing object or object assembly, then the system proceeds to step 342 again, and stores the imported object or object assembly, in this case recording the imported object or object assembly in place of the pre-existing object or object assembly. However, if at step 344 the user specifies that the imported object or object assembly should not replace the existing object or object assembly, then the system proceeds to step 346, at which a new GUID is determined and assigned to the imported object or object assembly. Then the system again proceeds to step 342, at which it stores the imported object or object assembly with the new GUID in the graphics library 100 (and also any appropriate EPGFLs).

Upon completion of step 342, the system proceeds to step 348, at which it is determined whether all of the imported objects and object assemblies have been checked for collisions with existing objects and object assemblies within the graphics library. If not all of the imported objects or object assemblies have been checked for collisions, the system proceeds to step 350, at which a next one of the imported objects or object assemblies is selected, at which point the system returns to step 340. If at step 348 it is determined that all of the imported objects and object assemblies have been checked for collisions, then the system has successfully reconciled all of the imported graphical data with pre-existing graphical data within the graphics library 100 and each of the EPGFLs 300 and scenes 400, and consequently the procedure for importing and reconciling the imported graphical data is ended at step 352. Although the steps 338-350 are shown to be performed with respect to objects/ object assemblies within an imported EPGFL 300, the same steps can be performed with respect to instantiated objects/ object assemblies that are imported as graphical data concerning specific scene(s) associated with the imported project file 200.

Figure 4:
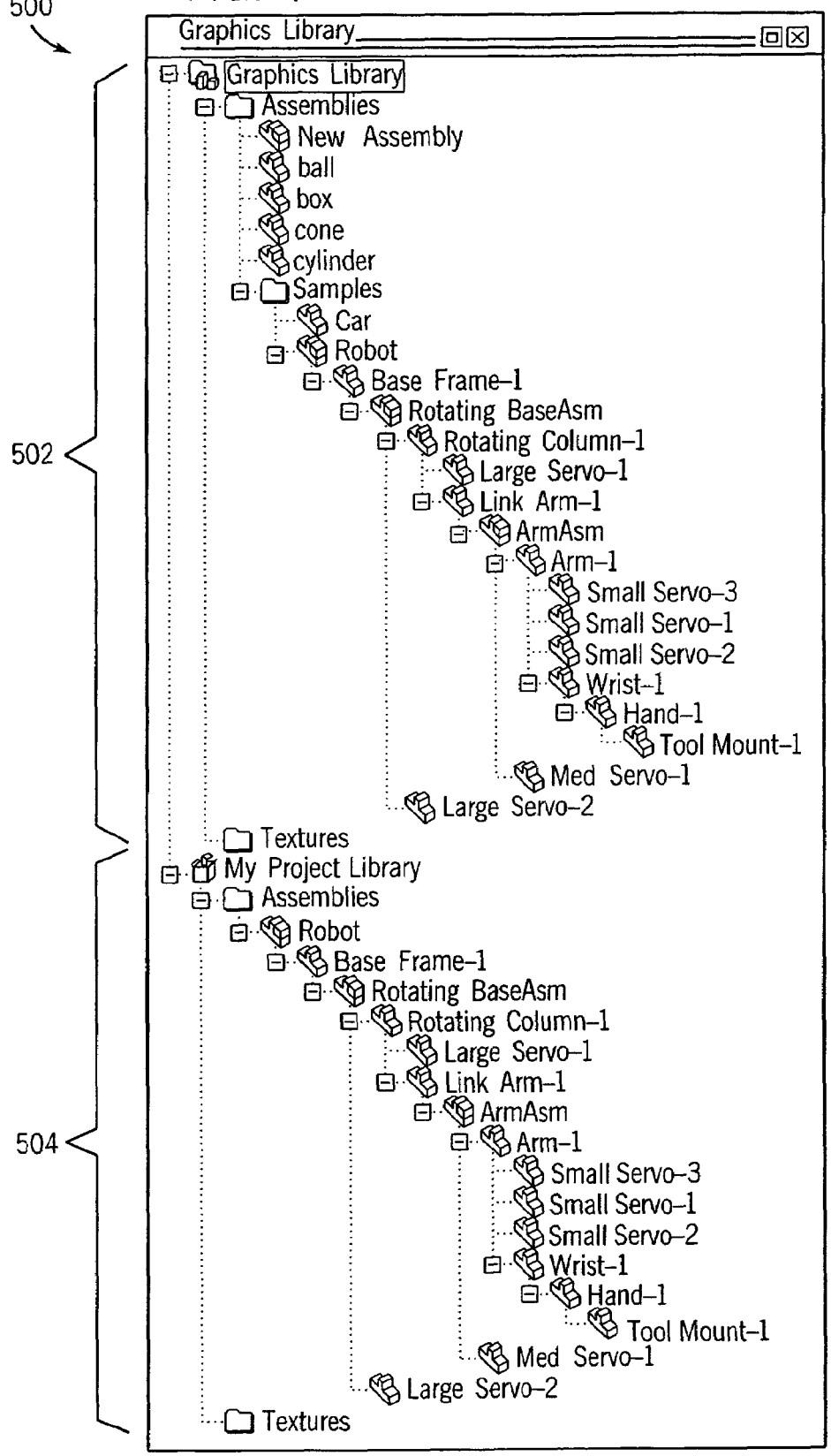
FIGS. 4-7 are exemplary screen shots that could be displayed in accordance with operation of the system of FIG. 1.
Figure 5:
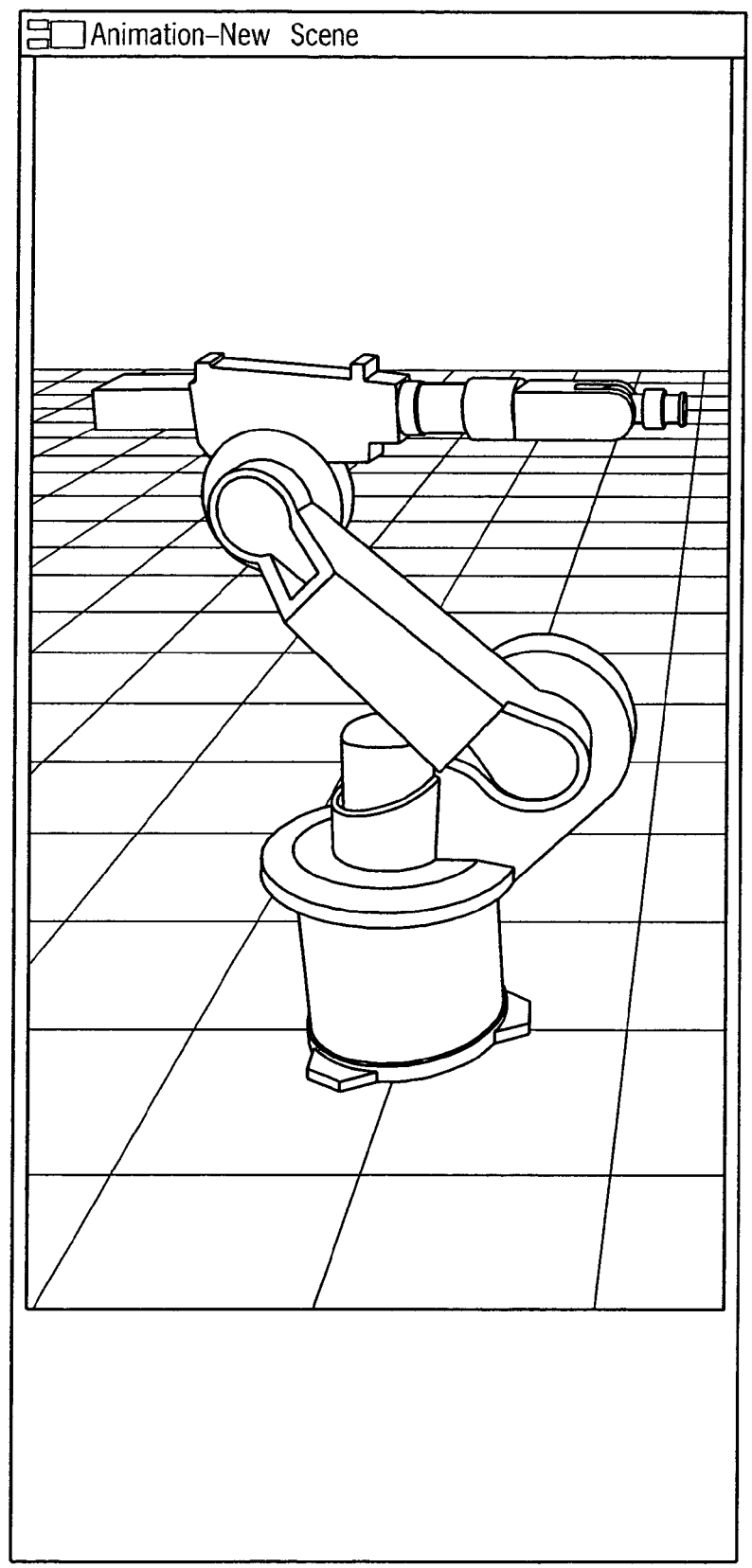

Turning to FIGS. 4-7, exemplary screen shots that could be displayed on the visual display device 60 of the system for managing graphical data 10 are provided. In particular, FIG. 4 provides a screen shot 500 depicting a graphical user interface by which a user is able to view selectable contents 502 of a graphics library (such as could be contained within a graphics library such as the graphics library 100 discussed above) and also selectable contents 504 of an EPGFL (such as could be contained within the EPGFL 300 within the project file 200 discussed above). As shown, the selectable contents 502 of the graphics library include all of the available assemblies and parts that a user can use to build a model from the graphics library, while the selectable contents 504 of the EPGFL include all of the assemblies and parts that have been placed into a current project. Additionally, FIG. 5 provides a screen shot 506 showing an exemplary scene view of an actual three-dimensional object (a robot).

Figure 6:
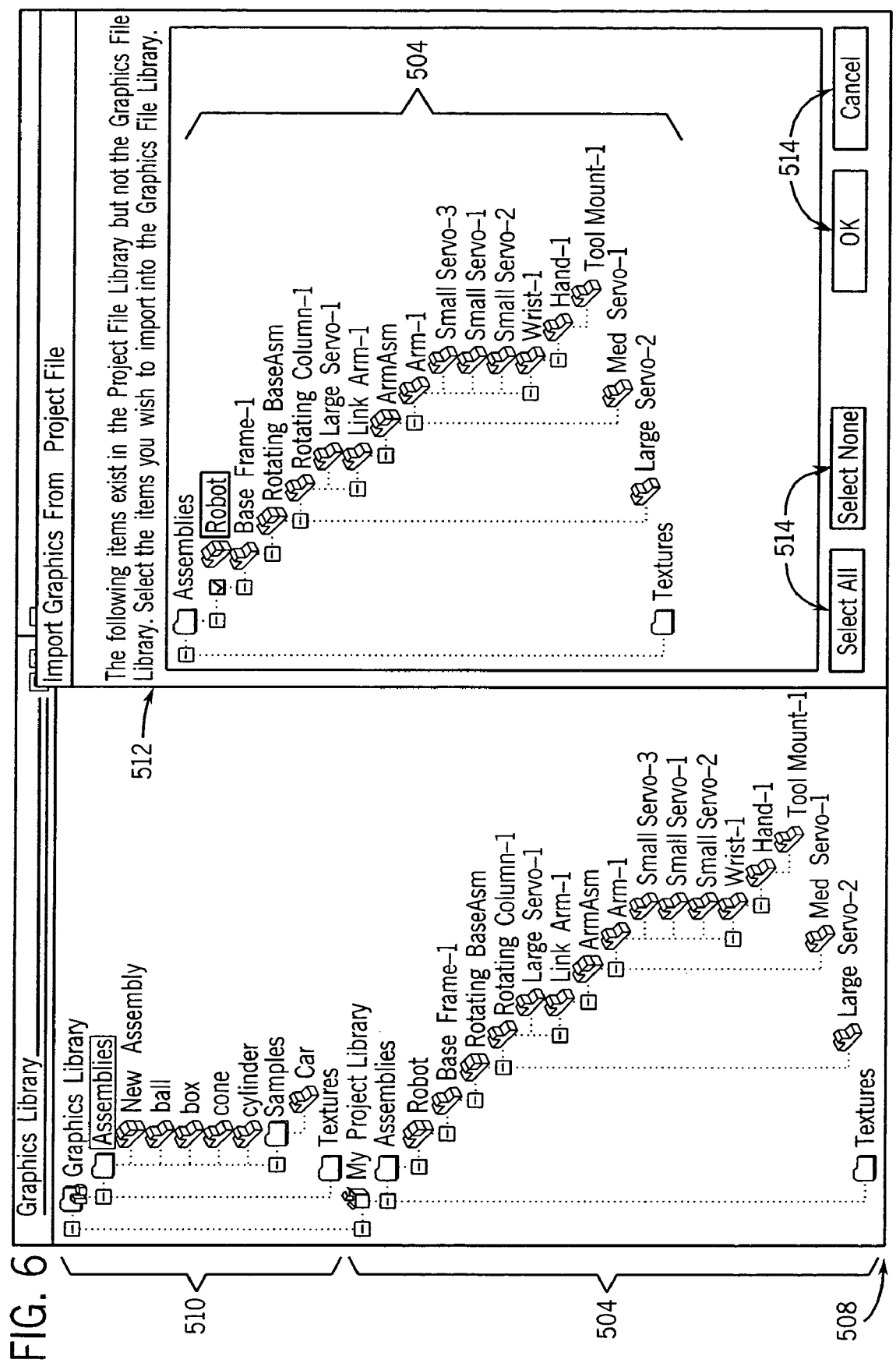

Turning to FIG. 6, a further screen shot 508 is provided of the visual display device 60 in which a graphical user interface is displayed by which a user can import objects/ object assemblies and models of a given project into a graphics library. In particular, as shown, the graphics library in this example has different contents 510 than the contents 502 of FIG. 4, namely, a robot assembly and all of its sub-components have been deleted from the graphics library in comparison with the contents 502 of FIG. 4. However, the contents 504 of the EPGFL are identical to those shown in FIG. 4. Thus, in this example, the contents 504 are contained within an EPGFL but not as part of the graphics library, such that it might be desirable to import the some or all of the contents of the EPGFL into the graphics library (this would occur, for example, where an EPGFL was just received from a remote source).

Further as shown, an "import graphics from project file" window 512 showing the contents 504 appears when the system 10 determines that the contents of the project are not contained within the graphics library or, in alternate embodiments, when the user indicates a desire to import the contents 504 into the graphics library by providing an "import from project" command. Once the window 512 appears, the user can then copy the models and objects/ object assemblies of the contents 504 into the graphics library. The user can accomplish this by, for example, moving an input device such as a mouse so that a pointer points to one or more of the models/objects/object assemblies, and then clicking on the mouse to select those items, or by using certain buttons 514 shown at the bottom of the window 512. Additionally, in some embodiments, the system 10 automatically determines which of the models and objects/object assemblies of the EPGFL are missing from the graphics library and then a dialog appears listing only those models/objects/object assemblies that do not already exist in the graphics library. Whether a model/object/object assembly exists within, or is missing from, the graphics library can be determined using the uniqueness tests described above (e.g., by way of the GUIDs, CRC values and names of different models/objects/object assemblies).

Figure 7:
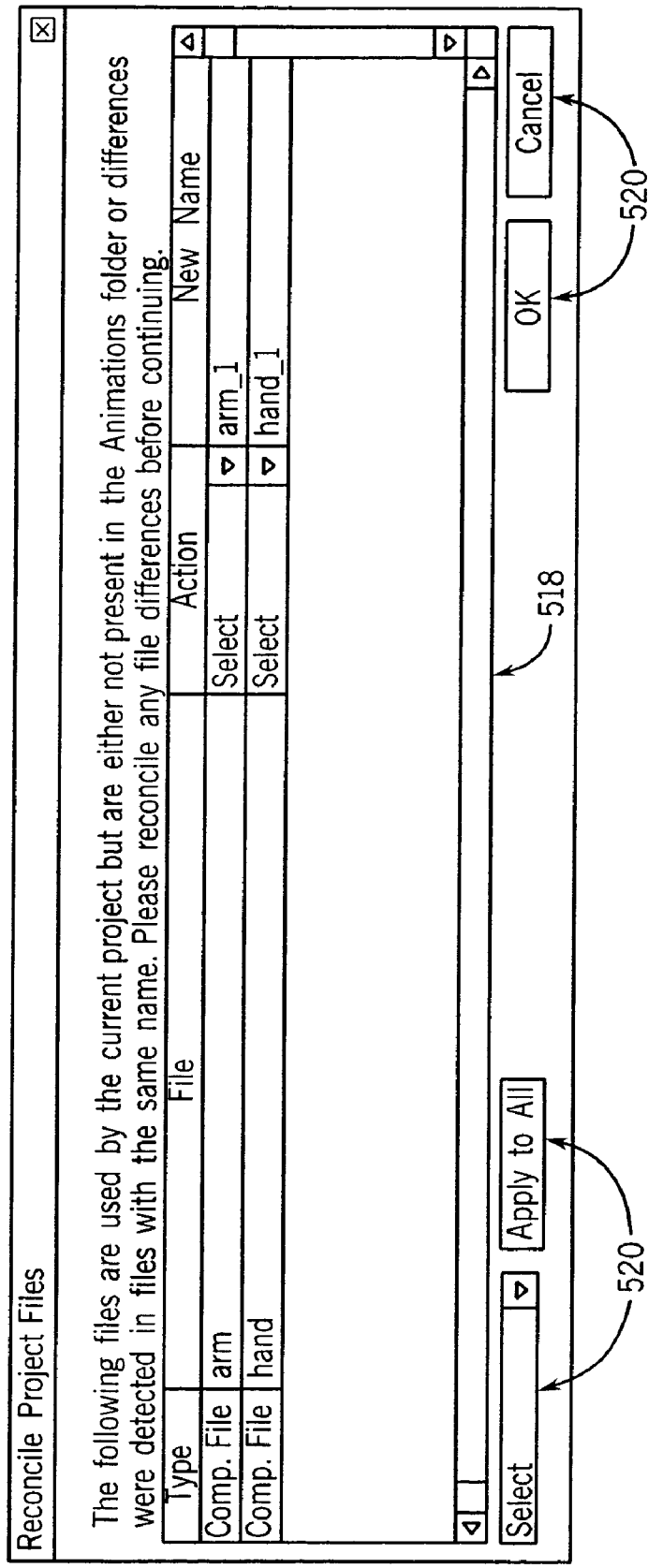

Further with respect to FIG. 7, an additional screen shot 516 depicts a graphical user interface for reconciling differences in model files upon the importation of models. In the screen shot 516 shown, the user has already chosen to import a new model file. However, upon commencing importation, the system 10 has discovered that there are existing model files with the same names that are different than the model files being imported (e.g., as determined by way of comparing CRC values). This signals a need to reconcile the different models. Thus, as shown, the user is prompted with a dialog box 518 and given a choice of replacing the existing models of the graphics library with the ones being imported. The screen shot 516 shows that a user can make choices by selecting various buttons 520 provided in connection with the dialog box 518.

The above-described embodiments of the invention described above with respect to FIGS. 1-7 provide several advantages in comparison with known systems and methods for managing graphical information. As described, fundamental attributes of graphical entities (which are more likely to be referred to by other graphical entities) are stored in models, while less fundamental attributes of graphical items are stored as part of objects/object assemblies (whether in EPGFLs or in scene memory locations). Consequently, the more fundamental information is clearly distinguished from the less fundamental information, such that users are cognizant that changes that they make to models are likely to affect multiple objects, object assemblies and projects, while changes made to the objects/object assemblies are less likely to affect multiple object assemblies or projects. Thus, the structuring of the data into layers helps to prevent the inadvertent alteration of graphical data that is used in multiple projects.

Further, by storing the graphical information into higher and lower layers, it is also possible to provide different levels of protection to different graphical information in order to protect the more fundamental information from inadvertent undesirable changes while leaving the less fundamental information more easy to change. In particular, as described above, the graphical information contained in the models 102 is identified both by the models' names and the corresponding CRC values, such that different models are clearly distinguished from one another. Consequently, in order to overwrite one model with another having the same name, a user must make a conscious decision to cause such a change to take place, despite warnings that the replacement data is different than the preexisting data (as determined by way of the CRC values). This is in contrast to the processes that must be followed in order to modify the less fundamental data associated with objects or object assemblies, which can be overwritten with less effort.

Additionally, the above-described system and method is advantageous in that the various codings of the graphical information make it possible to keep track of duplicate copies of certain graphical information concerning specific graphic images or projects that exist within both a general graphics library and dedicated project memory locations. By duplicatively storing the graphical data in this manner, a universal database of graphical data is maintained and yet, at the same time, specific subsets of the graphical data corresponding to specific projects are readily identifiable. Thus it becomes possible to easily isolate, send or otherwise transfer or work with the specific subsets of graphical data pertaining to specific projects.

It is specifically intended that the present invention not be limited to the embodiments and illustrations contained herein, but that modified forms of those embodiments including portions of the embodiments and combinations of elements of different embodiments also be included as come within the scope of the following claims.

I claim:

1. A system for managing graphical information, the system comprising:
   a processing device; and
   a first memory portion within at least one memory device that is coupled to the processing device, wherein the first memory portion stores
      a first plurality of files having a first type of information relating to graphical entities, and
      a second plurality of files having a second type of information relating to graphical entities, wherein each of the second plurality of files references at least one of the first plurality of files; and
   a second memory portion within the at least one memory device, wherein the second memory portion duplicatively stores a first subset of the first plurality of files and a second subset of the second plurality of files,
   wherein each of the files of the first subset are referenced by at least one of the files of the second subset,
   wherein the first and second subsets have information relating to a first project,
   wherein each of the first plurality of files includes a numeric value providing a compressed representation of the data of the file such that each numeric value of each of the first plurality of files is different from each of the other numeric values of the others of the first plurality of files,
   wherein each of the first plurality of files includes a name,
   wherein the processing device executes a stored program to compare files of the plurality of files with respect to numeric values and names, and when two files with the same name have different numeric values, notifying a user to reconcile the conflicting file names.

2. The system of claim 1, wherein at least a first portion of the first type of information relating to graphical entities relates to fundamental graphical information.

3. The system of claim 2, wherein the first type of information relating to graphical entities concerns models.

4. The system of claim 2, wherein the first portion of the first type of information includes information selected from the group consisting of primitive information, vertice information, face information, native color information, and native pivot information.

5. The system of claim 1, wherein at least a first portion of the second type of information relating to graphical entities relates to secondary graphical characteristics.

6. The system of claim 5, wherein the second type of information relating to graphical entities concerns objects and object assemblies.

7. The system of claim 5, wherein the first portion of the second type of information includes information selected from the group consisting of special color information, position information, scale information, orientation information, pivot offset information, and animation path information.

8. The system of claim 1, wherein each of the second plurality of files includes at least one reference by which the respective file refers to model information within one of the first plurality of files.

9. The system of claim 8, wherein each of the second plurality of files includes a numeric value, and each numeric value of each of the second plurality of files is different from each of the other numeric values of the others of the second plurality of files.

10. The system of claim 1, further comprising a third memory portion within the at least one memory device, wherein the third memory portion stores a third plurality of files, wherein each of the third plurality of files is related to a respective one of second subset of the second plurality of files.

11. The system of claim 10, wherein the third plurality of files stored within the third memory portion define a scene capable of being displayed on a graphical interface.

12. The system of claim 10, wherein each of the third plurality of files is an instantiated version of its corresponding file from the second subset.

13. The system of claim 12, wherein instantiation of the third plurality of files involves replacing at least some of the information of the second type with alternate information.

14. The system of claim 10, wherein the first memory portion is a graphics library, the second memory portion is an EPGFL, and the third memory portion is a scene memory portion, and wherein the second and third memory portions are comprised within a fourth memory portion that is a project file.

15. The system of claim 1, further comprising: a third memory portion within the at least one memory device, wherein the third memory portion duplicatively stores an additional subset of the first plurality of files and another subset of the second plurality of files; and communication means for sending and receiving graphical information to and from remote locations.

16. A method of managing information relating to graphical entities, the method comprising:

receiving selections of graphical entities to be incorporated into a project;

retrieving higher-level information concerning the selected graphical entities from a first memory portion;

storing the higher-level information concerning the selected graphical entities in a second memory portion associated with the project, wherein the higher-level information stored in the second memory portion is duplicative of the higher-level information stored in the first memory portion;

retrieving lower-level information concerning components of the selected graphical entities from the first memory portion;

storing the lower-level information concerning the components of the selected graphical entities in the second memory portion, wherein the lower-level information stored in the second memory portion is duplicative of the lower-level information stored in the first memory portion;

receiving a command to create one of the graphical entities;

providing a template with fields to be completed; receiving information to complete the fields;

calculating a first identification number based upon the received information; and storing the higher-level information corresponding to the one graphical entity in the first memory portion, wherein the higher-level information includes the received information and the first identification number, wherein the received information includes information identifying at least one of the components as corresponding to the one graphical entity and wherein the received information includes at least one of: special color information, position information, scale information, orientation information, pivot offset information, animation path information, and a name corresponding to the one graphical entity, and wherein the received information is stored in a file corresponding to the one graphical entity.

17. The method of claim 16, wherein the components are models and the selected graphical entities include objects and object assemblies.

18. The method of claim 16, wherein each of the graphical entities is identified by a respective first identification number, wherein each of the first identification numbers of each of the graphical entities differs from every other of the first identification numbers, and each of the components is identified both by a respective name and a respective second identification number, wherein each of the names of each of the components differs from every other of the names, and each of the second identification numbers of each of the components differs from every other of the second identification numbers.

19. The method of claim 18, further comprising: receiving a command to create one of the components; providing a template with fields to be completed; receiving information to complete the fields; and calculating the second identification number based upon the received information; and storing the lower-level information corresponding to the one component in the first memory portion, wherein the lower-level information includes the received information and an identification number.

20. The method of claim 19, wherein the received information concerns primitive information, vertice information, face information, native color information, native pivot information, and a name corresponding to the one component, wherein the received information is stored in a file corresponding to the one component.

21. The method of claim 16, further comprising: providing a template with fields to be completed with substitute information intended to replace at least some of the higher-level information corresponding to one of the selected graphical entities; receiving the substitute information to complete the fields; and recalculating a first identification number associated with the one selected graphical entity based upon the received substitute information; and storing a new graphical entity with new higher-level information including at least the recalculated first identification number and the substitute information in a third memory portion.

22. The method of claim 21, further comprising displaying a scene on a graphical output device based upon the new higher-level information of the new graphical entity in the third memory portion.

23. The method of claim 16, further comprising: receiving a command to modify one of the graphical entities; providing a template with fields to be completed; receiving information to complete the fields, wherein the received information is intended to replace at least a portion of the higher-level information corresponding to the one graphical entity; and storing a modified version of the one graphical entity having modified higher-level information within at least one of the first and second memory portions, wherein the modified higher-level information includes the received information.

24. The method of claim 23, wherein the modified version of the one graphical entity is stored in place of the one graphical entity in both of the first and second memory portions.

25. The method of claim 16, further comprising: storing additional higher-level and lower-level information in a third memory location, wherein the second and third memory locations together form a fourth memory location; and sending all of the information in the fourth memory location to a remote destination, wherein the information stored in the fourth memory constitutes all graphical information relating to the project.

* * * * *